United States Patent
Tang et al.

(10) Patent No.: US 8,028,213 B2
(45) Date of Patent: Sep. 27, 2011

(54) DATA TRANSFORMATION METHOD AND RELATED DEVICE FOR A TESTING SYSTEM

(75) Inventors: Chih-Wei Tang, Penghu County (TW);
Chien-Yu Wei, Hsinchu County (TW);
Wei-Yi Wei, Nantou County (TW);
Jia-Jye Shyu, Hsinchu (TW)

(73) Assignee: NOVATEK Microelectronics Corp.,
Hsinchu Science Park, Hsin-Chu (TW)

( * ) Notice: Subject to any disclaimer, the term of this patent is extended or adjusted under 35 U.S.C. 154(b) by 449 days.

(21) Appl. No.: 12/126,995

(22) Filed: May 26, 2008

(65) Prior Publication Data
US 2009/0271677 A1    Oct. 29, 2009

(30) Foreign Application Priority Data
Apr. 25, 2008 (TW) .................... 97115300 A

(51) Int. Cl.
*G01R 31/28* (2006.01)
(52) U.S. Cl. ....................................... 714/738
(58) Field of Classification Search .................. 714/738, 714/724, 712, 821, 820, 814, 701, 815
See application file for complete search history.

(56) References Cited

U.S. PATENT DOCUMENTS

| | | | | |
|---|---|---|---|---|
| 3,944,723 A * | 3/1976 | Fong | ................. | 178/3 |
| 3,973,087 A * | 8/1976 | Fong | ............. | 375/211 |
| 3,973,240 A * | 8/1976 | Fong | ............. | 375/212 |
| 5,473,666 A * | 12/1995 | Szczebak et al. | ............... | 379/3 |
| 5,652,712 A * | 7/1997 | Szczebak et al. | ............... | 702/85 |
| 5,931,962 A * | 8/1999 | Dang | ............. | 714/731 |
| 6,718,498 B2 * | 4/2004 | Imark et al. | ................. | 714/741 |
| 6,957,371 B2 * | 10/2005 | Ricchetti et al. | ............. | 714/733 |
| 7,369,957 B2 * | 5/2008 | Chang et al. | ................. | 702/117 |
| 2002/0009132 A1 * | 1/2002 | Miller | ............. | 375/222 |
| 2003/0043926 A1 * | 3/2003 | Terashima et al. | ............. | 375/257 |
| 2009/0296797 A1 * | 12/2009 | Wei et al. | ............. | 375/228 |

FOREIGN PATENT DOCUMENTS
| | | |
|---|---|---|
| CN | 1690724 A | 11/2005 |
| CN | 1802570 A | 7/2006 |

* cited by examiner

*Primary Examiner* — Phung M Chung
(74) *Attorney, Agent, or Firm* — Winston Hsu; Scott Margo

(57) ABSTRACT

A data transformation method for a testing system includes using a reception end for receiving a test signal comprising a test data and a timing information corresponding to the test data, and using a transformation unit for transforming the test data according to the timing information, so as to generate a test pattern utilized for testing a communication device.

16 Claims, 4 Drawing Sheets

DATA TRANSFORMATION METHOD AND RELATED DEVICE FOR A TESTING SYSTEM

BACKGROUND OF THE INVENTION

1. Field of the Invention

The present invention relates to a data transformation method and related device for a testing system, and more particularly, to a data transformation method and related device for maintaining normal testing operation and improving testing efficiency.

2. Description of the Prior Art

With development of wideband wireless communication technology, video transmission is widely applied in a mobile communication system. Therefore, transmission bandwidth is expected to be as wide as possible. In the prior art, a video transmission interface generally adopts parallel structure, to transmit data via multiple routes. However, as the bit amount of video data increases, the width of a parallel bus must be expanded to transmit video data, causing degradation of efficiency of space utility, increase of signal frequency and electromagnetic radiation, and electromagnetic interference.

Therefore, to improve the above-mentioned problems, the prior art provides different serial transmission interfaces to enhance space-utility efficiency and reduce electromagnetic interference, e.g. the Mobile Industry Processor Interface (MIPI). When a mobile communication device adopts a serial transmission interface to communicate with a multimedia peripheral equipment, the factors to be considered by a designer include power consumption, signal bandwidth, transmission distance, cost, noise response, and number of pins. In such a case, when the designer accomplishes the design of the mobile communication device, the mobile communication device is performed different tests in different test environments for improving performance accordingly.

For example, please refer to FIG. 1. FIG. 1 is a schematic diagram of a testing system 10 adopting a serial transmission interface 100 according to the prior art. The testing system 10 comprises a signal generator 102, a transmission unit 104, and a reception unit 106. The signal generator 102 is utilized for generating different signal patterns and outputting the signal patterns to the transmission unit 104 by means of parallel or serial transmission. The transmission unit 104 is utilized for transforming the signal patterns generated by the signal generator 102 into a default format conforming to the serial transmission interface 100, and outputting to the reception unit 106. When the reception unit 106 is installed in a mobile communication device, the reception unit 106 is utilized for receiving the signal patterns outputted by the transmission unit 104 via the serial transmission interface 100, so as to drive applications AP_1~AP_n correspondingly, and a designer can judge the efficiency of the mobile communication device accordingly.

However, in the prior art, the signal generator 102 generally adopts a binary waveform file using a unit of a time interval as input to verify the mobile communication device. The waveform file records waveforms to be inputted. However, if a speed of a waveform is greater than an operating speed, the waveform cannot be verified. Moreover, the signal generator 102 cannot perform operations of replacing and extending on the waveform file, so that the application range is limited.

SUMMARY OF THE INVENTION

It is therefore a primary objective of the claimed invention to provide a data transformation method and related device for a testing system.

The present invention discloses a data transformation method for a testing system, which comprises receiving a test signal comprising a test data and a timing information corresponding to the test data, and transforming the test data according to the timing information, so as to generate a test pattern.

The present invention further discloses a data transformation device for a testing system, which comprises a reception end and a transformation unit. The reception end is utilized for receiving a test signal comprising a test data and a timing information corresponding to the test data. The transformation unit is coupled to the reception end for transforming the test data according to the timing information, so as to generate a test pattern.

The present invention further discloses a testing system for testing a communication device, which comprises a reception unit, a transmission unit, a serial transmission interface, a data processing device, and a data transformation unit. The reception unit is installed in the communication device for receiving a plurality of test patterns. The transmission unit is utilized for outputting the plurality of test patterns. The serial transmission interface is coupled between the reception unit and the transmission unit for transmitting the plurality of test patterns. The data processing device is utilized for generating a plurality of test signals each comprising a test data and a timing information corresponding to the test data. The data transformation unit is coupled between the data processing device and the transmission unit for transforming the plurality of test signals according to the timing information corresponding to the plurality of test signals, so as to generate the plurality of test patterns.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
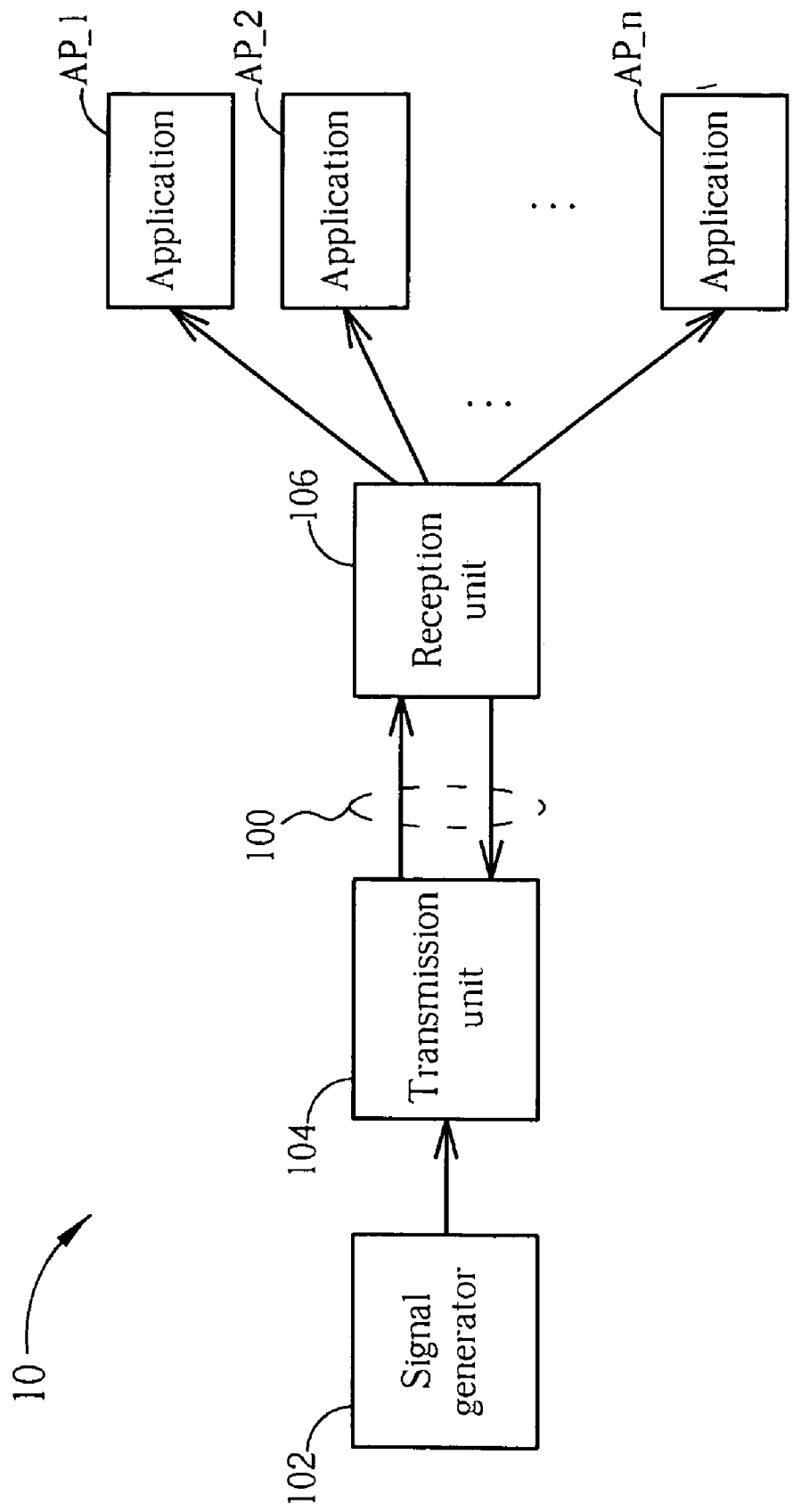
FIG. 1 is a schematic diagram of a testing system adopting a serial transmission interface according to the prior art.
Figure 2:
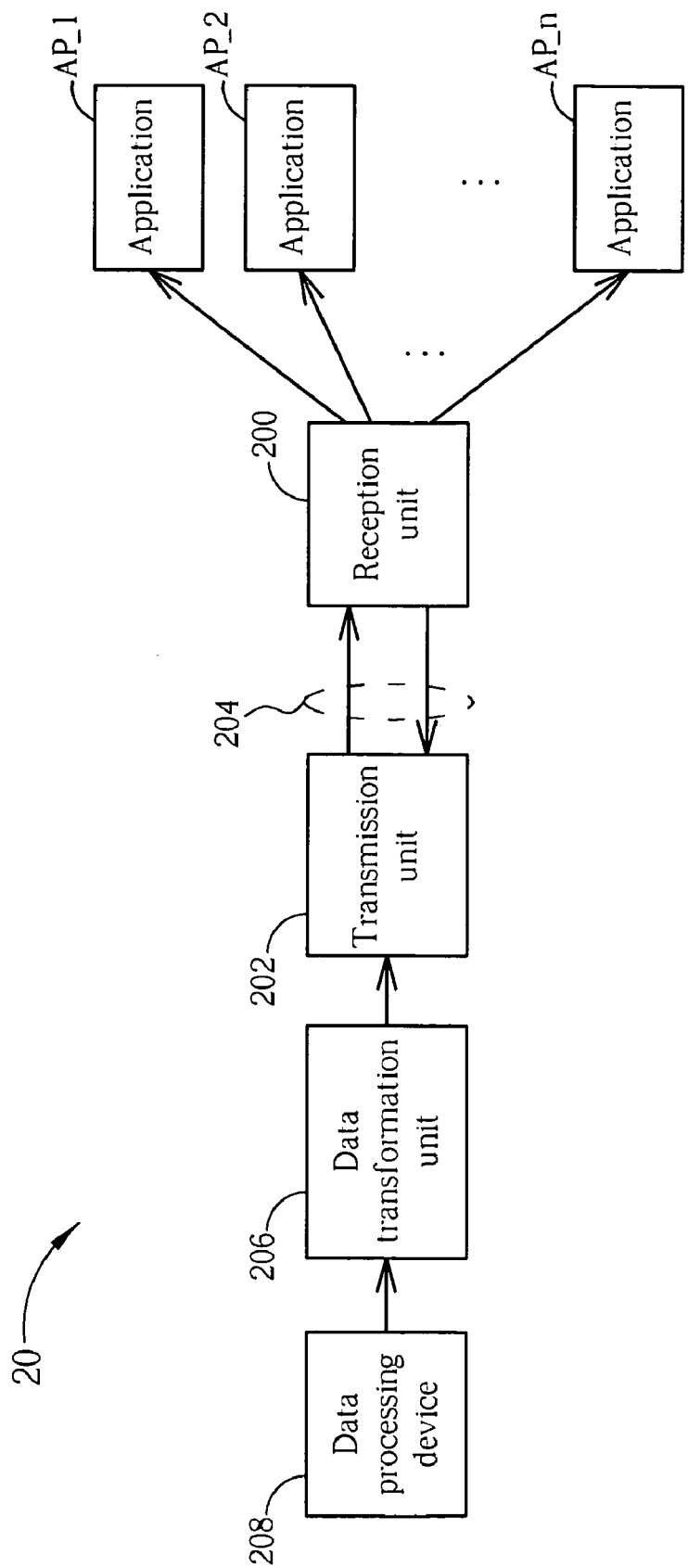
FIG. 2 is a schematic diagram of a testing system for testing a communication device according to an embodiment of the present invention.

Please refer to FIG. 2. FIG. 2 is a schematic diagram of a testing system 20 for testing a communication device according to an embodiment of the present invention. The testing system 20 comprises a reception unit 200, a transmission unit 202, a serial transmission interface 204, a data transformation unit 206, and a data processing device 208. The data processing device 208 is utilized for generating a plurality of test signals, and the data transformation unit 206 is utilized for transforming the plurality of test signals into a plurality of test patterns. Then, the transmission unit 202 outputs the plurality of test patterns to the reception unit 200 via the serial transmission interface 204. As a result, the reception unit 200 installed in the communication device can drive applications AP_1~AP_n correspondingly, and a designer can determine efficiency of the communication device accordingly. Moreover, each of the plurality of test signals generated by the data processing device 208 comprises a test data and a timing information corresponding to the test data. If a test signal is a high-speed test signal, the test data of the test signal comprises a plurality of parallel bit data. If a test signal is a low-speed test signal, the test data of the test signal comprises single-bit data.

Figure 3:
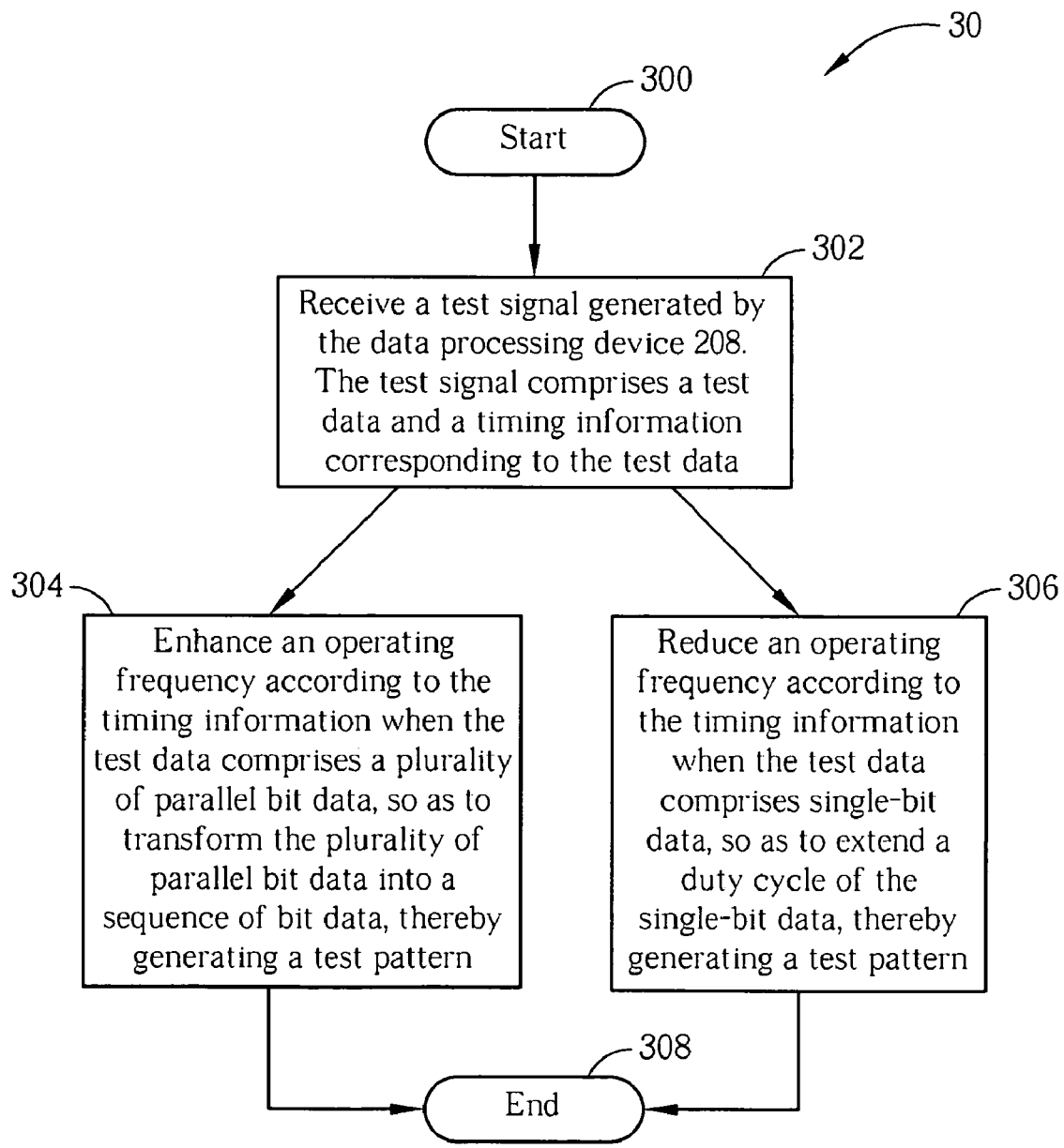
FIG. 3 is a schematic diagram of a data transformation process of the data transformation unit shown in FIG. 2 according to an embodiment of the present invention.

Furthermore, please refer to FIG. 3. FIG. 3 is a schematic diagram of a data transformation process 30 of the data transformation unit 206 according to an embodiment of the present invention. The data transformation process 30 is utilized for transforming test signals into test patterns, and includes the following steps:

Step 300: Start.

Step 302: Receive a test signal generated by the data processing device 208. The test signal comprises a test data and a timing information corresponding to the test data.

Step 304: Enhance an operating frequency according to the timing information when the test data comprises a plurality of parallel bit data, so as to transform the plurality of parallel bit data into a sequence of bit data, thereby generating a test pattern.

Step 306: Reduce an operating frequency according to the timing information when the test data comprises single-bit data, so as to extend a duty cycle of the single-bit data, thereby generating a test pattern.

Step 308: End.

Via the data transformation process 30, the data transformation unit 206 transforms the test data according to the timing information of the test signal. When the test signal is a high-speed test signal, the present invention transforms the plurality of parallel bit data into a sequence of bit data by enhancing the operating frequency. When the test signal is a low-speed test signal, the present invention extends the duty cycle of the single-bit data by reducing the operating frequency. Besides, the data transformation process 30 can replace the test pattern with a predefined test pattern according to a control signal. In other words, the data transformation unit 206 can perform operations of parallel-to-serial, extending and replacing on the test signals generated by the data processing device 208.

Therefore, as for the high-speed test data, the data processing device 208 can transmit multi-bit data in parallel in a specific duration. Then, the data transformation unit 206 can enhance the operating frequency according to the data transformation process 30, so as to transform the parallel bit data into a sequence of bit data. In other words, since the data transformation unit 206 can transform the plurality of parallel bit data into a sequence of bit data, the data processing device 208 can transmit high-speed test data to the data transformation unit 206 through time-compression. As a result, when the speed of the test data is greater than an operating speed, the present invention can still maintain normal testing operations via time-compression. On the contrast, as for low-speed test data, the data processing device 208 can transmit single-bit data in a specific duration. Then, the data transformation unit 206 can reduce the operating frequency according to the data transformation process 30, to extend the duty cycle of the single-bit data, and recover an original timing. In other words, since the data transformation unit 206 can extend the duty cycle of single-bit data, the data processing device 208 can replace the low-speed test data with less bit and transmit to the data transformation unit 206. As a result, the amount of data to be transmitted is reduced, so as to improve testing efficiency.

Figure 4:
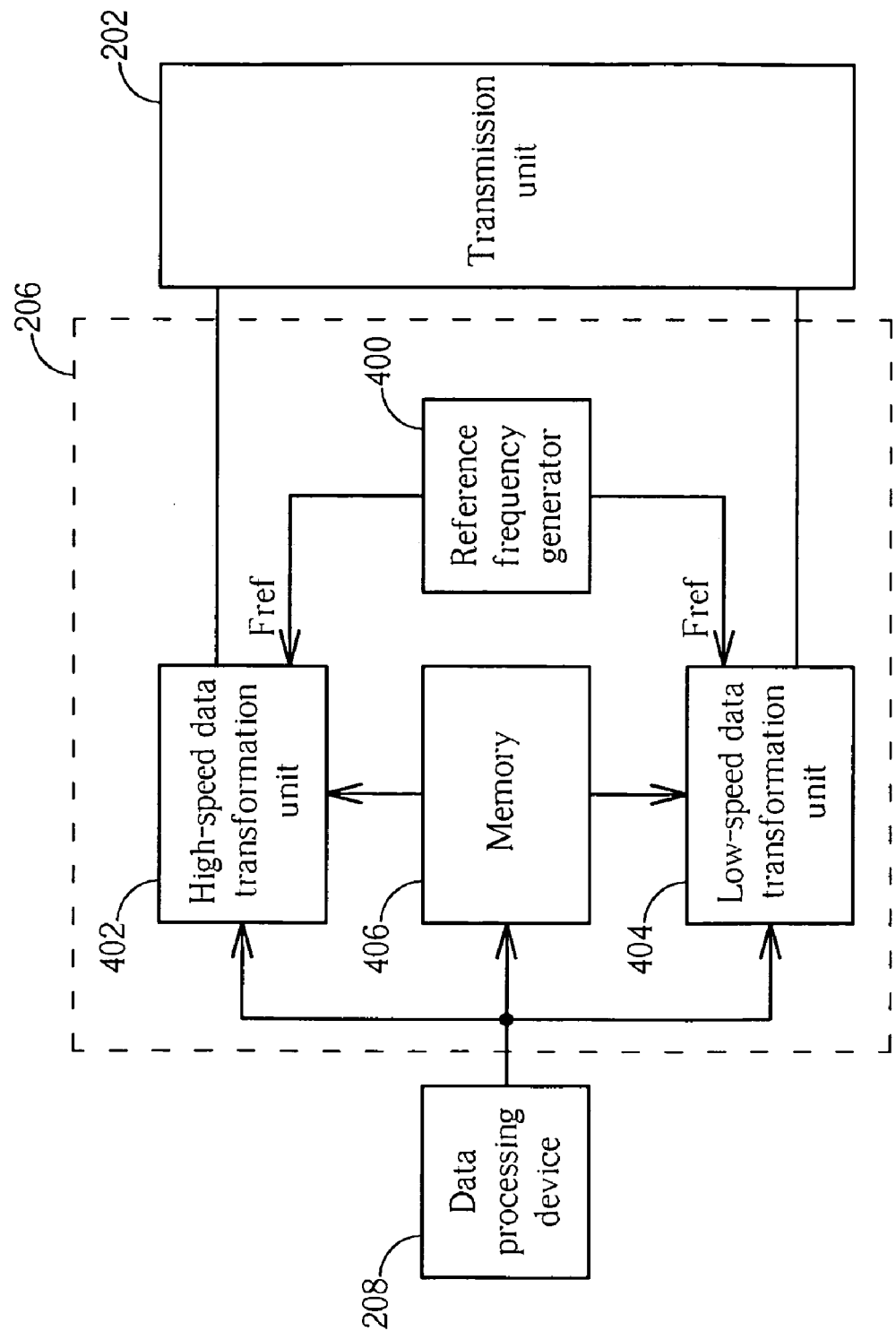
FIG. 4 is a system block diagram of the data transformation unit shown in FIG. 2 according to an embodiment of the present invention.

Furthermore, as for the realization of the data transformation unit 206, please refer to FIG. 4. As shown in FIG. 4, the data transformation unit 206 comprises a reference frequency generator 400, a high-speed data transformation unit 402, a low-speed data transformation unit 404, and a memory 406. The reference frequency generator 400 is utilized for generating an operating frequency Fref. The high-speed data transformation unit 402 and the low-speed data transformation unit 404 are both coupled between the reference frequency generator 400 and the data processing device 208, and are utilized for processing high-speed and low-speed test signals respectively. As for the high-speed test signals, the high-speed data transformation unit 402 can enhance the operating frequency Fref according to the corresponding timing information via a frequency multiplier (not shown in FIG. 4) or other frequency regulators, so as to transform the plurality of parallel bit data into a sequence of bit data. As for the low-speed test signals, the low-speed data transformation unit 404 can reduce the operating frequency Fref according to the corresponding timing information via a frequency divider (not shown in FIG. 4) or other frequency regulators, so as to extend the duty cycle of single-bit data. Moreover, in FIG. 4, the memory 406 is utilized for storing a plurality of predefined test patterns. When the high-speed data transformation unit 402 or the low-speed data transformation unit 404 receives a specific control signal, the high-speed data transformation unit 402 or the low-speed data transformation unit 404 can correspondingly select one of the plurality of predefined test patterns stored in the memory 406 and output to the transmission unit 202. Therefore, the data transformation unit 206 can perform operations of parallel-to-serial, extending and replacing on the test signals generated by the data processing device 208.

In conclusion, via the testing system 20, the data transformation unit 206 can perform operations of parallel-to-serial, extending and replacing on the test signals generated by the data processing device 208, such that the data processing device 208 can perform time compression on high-speed test data or time extension on low-speed test data, to maintain normal testing operation and improve testing efficiency.

Those skilled in the art will readily observe that numerous modifications and alterations of the device and method may be made while retaining the teachings of the invention.

What is claimed is:

1. A data transformation method for a testing system comprising:
   using a reception end for receiving a test signal comprising a test data and a timing information corresponding to the test data; and
   using a transformation unit for transforming the test data according to the timing information, so as to generate a test pattern utilized for testing a communication device.

2. The data transformation method of claim 1, wherein the test data comprises a plurality of parallel bit data.

3. The data transformation method of claim 2, wherein transforming the test data according to the timing information so as to generate the test pattern is enhancing an operating frequency according to the timing information, so as to transform the plurality of parallel bit data into a sequence of bit data, thereby generating the test pattern.

4. The data transformation method of claim 1, wherein the test data comprises a bit data.

5. The data transformation method of claim 4, wherein transforming the test data according to the timing information so as to generate the test pattern is reducing an operating frequency according to the timing information, so as to extend a duty cycle of the bit data, thereby generating the test pattern.

6. The data transformation method of claim 1 further comprising replacing the test pattern with a predefined test pattern according to a control signal.

7. A data transformation device for a testing system comprising:
- a reception end for receiving a test signal comprising a test data and a timing information corresponding to the test data; and
- a transformation unit coupled to the reception end for transforming the test data according to the timing information, so as to generate a test pattern utilized for testing a communication device.

8. The data transformation device of claim 7, wherein the test data comprises a plurality of parallel bit data.

9. The data transformation device of claim 8, wherein the transformation unit enhances an operating frequency according to the timing information, so as to transform the plurality of parallel bit data into a sequence of bit data, thereby generating the test pattern.

10. The data transformation device of claim 7, wherein the test data comprises a bit data.

11. The data transformation device of claim 10, wherein the transformation unit reduces an operating frequency according to the timing information, so as to extend a duty cycle of the bit data, thereby generating the test pattern.

12. The data transformation device of claim 7, wherein the transformation unit is further utilized for replacing the test pattern with a predefined test pattern according to a control signal.

13. A testing system for testing a communication device comprising:
- a reception unit installed in the communication device for receiving a plurality of test patterns;
- a transmission unit for outputting the plurality of test patterns;
- a serial transmission interface coupled between the reception unit and the transmission unit for transmitting the plurality of test patterns;
- a data processing device for generating a plurality of test signals each comprising a test data and a timing information corresponding to the test data; and
- a data transformation unit coupled between the data processing device and the transmission unit for transforming the plurality of test signals according to the timing information corresponding to the plurality of test signals, so as to generate the plurality of test patterns.

14. The testing system of claim 13, wherein the data transformation unit comprising:
- a reference frequency generator for generating an operating frequency;
- a high-speed data transformation unit coupled between the reference frequency generator and the data processing device for enhancing the operating frequency according to the timing information when a test data of a test signal comprises a plurality of parallel bit data, so as to transform the plurality of parallel bit data into a sequence of bit data; and
- a low-speed data transformation unit coupled between the reference frequency generator and the data processing device for reducing the operating frequency according to the timing information when a test data of a test signal comprising a bit data, so as to extend a duty cycle of the bit data.

15. The testing system of claim 13 further comprising a memory for storing a plurality of predefined test patterns.

16. The testing system of claim 15, wherein the data transformation unit is further utilized for selecting one of the plurality of predefined test patterns according to a control signal, to generate one of the plurality of test patterns.

* * * * *